(No Model.)
W. H. JOHNSON.
SHOVEL HANDLE.
No. 262,788. Patented Aug. 15, 1882.
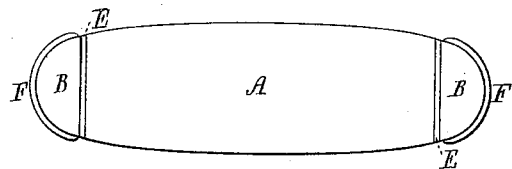
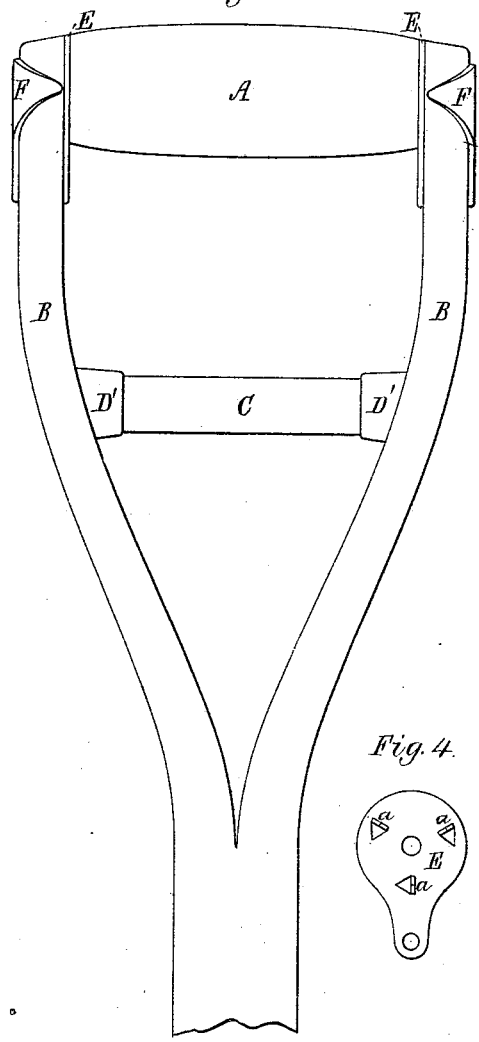
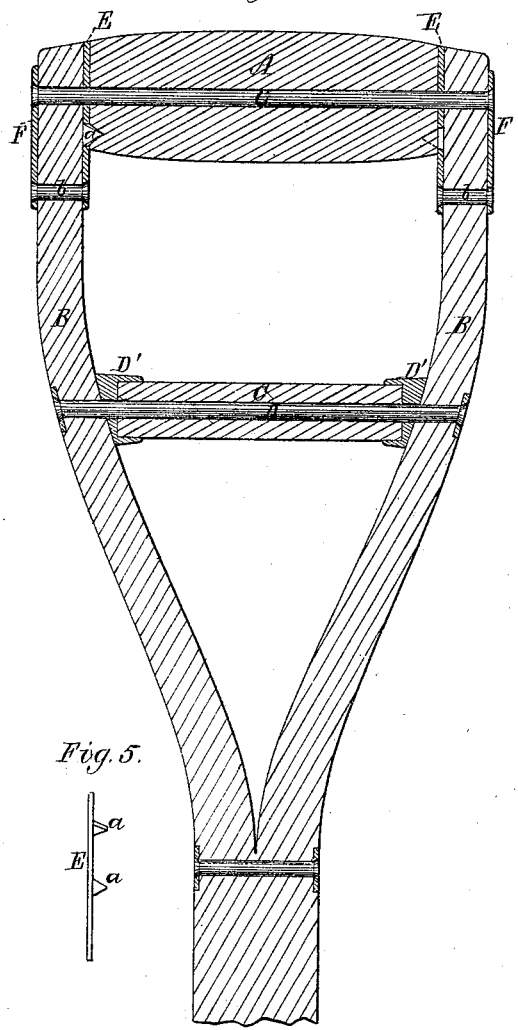
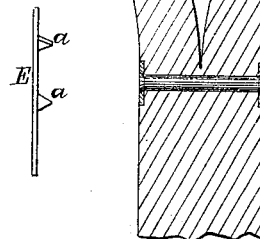
Witnesses.
S. N. Piper
E. B. Pratt
Inventor.
Wm. Holman Johnson,
by R. H. Eddy atty

UNITED STATES PATENT OFFICE.

WILLIAM HOLMAN JOHNSON, OF INDUSTRY, MAINE.

SHOVEL-HANDLE.

SPECIFICATION forming part of Letters Patent No. 262,788, dated August 15, 1882.

Application filed June 6, 1882. (No model.)

*To all whom it may concern:*

Be it known that I, WILLIAM HOLMAN JOHNSON, of Industry, in the county of Franklin, of the State of Maine, have invented a new and useful Improvement in Shovel-Handles; and I do hereby declare the same to be described in the following specification and represented in the accompanying drawings, of which—

Figure 1 is a front view, Fig. 2 a top view, and Fig. 3 a vertical and longitudinal section, of a handle containing my improvement. Fig. 4 is a rear view, and Fig. 5 an edge view, of one of the two metallic re-enforces, to be hereinafter described.

My present improvement relates to that class of wooden handles for shovels or similar implements wherein the upper portion of the handle is furcated, and is secured to the round or hand-grip arranged between the two prongs of the fork, my said improvement being for the purpose of strengthening the handle and preventing the round from revolving on its sustaining-rivet.

In Letters Patent granted to me, and entitled No. 9,728 of reissues of United States patents, I have shown and described a shovel-handle of the aforesaid class, its round or hand-grip being provided at its ends with eccentrically-arranged tenons to enter correspondingly-shaped holes in the prongs, such tenons and holes being to prevent the round from turning on the rivet, going through it and the prongs, and serving, with metallic clasps, to hold the round in connection with the prongs. My said present improvement is intended to dispense with such tenons and holes, not only on account of the expense of their construction, but also as the holes weaken the prongs and render them liable to split, and, besides, are apt, with the tenons, to become worn by use of the handle. In place, therefore, of such tenon and its hole of reception, I insert between each prong and the round end next adjacent thereto a metallic re-enforce formed as represented in Figs. 4 and 5, it being provided with spurs to extend from it into the round, and, besides, it projects below the round and laps on the prongs, and is secured to it and the end clasp by one or more rivets. This re-enforce has a hole in it to receive the rivet which goes axially through the round.

In the drawings, A represents the round, and B B the two prongs, of the handle, these latter being connected between the round and their junction by a brace, C, and a rivet, D, going through it and the prongs, and also going through two metallic shoes, D', formed and arranged at the ends of the brace in manner as represented.

The two re-enforces are shown at E E and their spurs at *a*, each of said re-enforces being fastened to the next adjacent prong by a rivet, *b*, going through the re-enforce, the prong, and the metallic clasp F.

The rivet which goes through the two clasps F, the two re-enforces E, and the two prongs is represented at G. Each re-enforce, by being fastened to a prong and one of the clasps, and having its spurs driven into the round, effectually prevents the round from turning on the rivet, and, besides, it aids very much in strengthening the handle and preventing the round from wearing and working loose at its junction with the prongs. It is also advantageous in other respects.

I would remark that instead of providing the re-enforce with spurs to enter the round and fasten it to the re-enforces, each of such re-enforces may have a hole or holes in it to receive a nail or nails to secure it to the round.

I do not herein claim in a shovel-handle the hand-grip or round provided with eccentrically-arranged tenons to enter holes or mortises in the prongs of the handle; but

What I claim as my present improvement is as follows, viz:

1. In combination with the prongs and the round of the handle, two metallic re-enforces arranged between and fastened to said prongs and round, and arranged on their connecting-rivet, all being substantially as described.

2. In combination with the round, the prongs, their connecting-rivet, and the end clasps applied to it and the prongs, as described, the two metallic re-enforces arranged between the round and the prongs and upon their connecting-rivet, and secured to the round, and also to both prongs and end clasps, by means substantially as described.

3. The combination of the two metallic shoes with the brace, its supporting-rivet, and the two handle-prongs, combined with the round or hand-grip, all being essentially as set forth.

WILLIAM HOLMAN JOHNSON.

Witnesses:
T. F. BELCHER,
S. CLIFFORD BELCHER.